US009451413B1

(12) United States Patent
Chao et al.

(10) Patent No.: US 9,451,413 B1
(45) Date of Patent: Sep. 20, 2016

(54) APPARATUS AND METHOD FOR PROVIDING ASSISTANCE DATA HEATMAPS

(71) Applicant: QUALCOMM Incorporated, San Diego, CA (US)

(72) Inventors: Hui Chao, San Jose, CA (US); Saumitra Mohan Das, Santa Clara, CA (US); Ravi Palanki, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/712,803

(22) Filed: May 14, 2015

(51) Int. Cl.
*H04W 24/00* (2009.01)
*H04W 4/04* (2009.01)

(52) U.S. Cl.
CPC ...................................... *H04W 4/04* (2013.01)

(58) Field of Classification Search
CPC .... G01S 5/0252; G01S 5/021; G01S 5/0257; G01S 1/028; G01S 5/0009; G01S 5/0054; G01S 5/02; G01S 5/06; G01S 5/0063; G01S 5/14; G01S 19/23; G01S 1/042; H04W 64/00; H04W 4/02; H04W 52/06
See application file for complete search history.

(56) References Cited

U.S. PATENT DOCUMENTS

| 8,320,939 | B1 | 11/2012 | Vincent |
| 9,285,227 | B1 | 3/2016 | Chao et al. |
| 2010/0039929 | A1 | 2/2010 | Cho et al. |
| 2011/0269479 | A1* | 11/2011 | Ledlie ................... G01S 5/0252 455/456.1 |
| 2012/0072106 | A1 | 3/2012 | Han et al. |
| 2013/0281111 | A1 | 10/2013 | Syrjarinne et al. |
| 2014/0018096 | A1 | 1/2014 | Jagannath |
| 2014/0155090 | A1* | 6/2014 | Khorashadi ............. H04W 4/04 455/456.2 |

* cited by examiner

*Primary Examiner* — Kwasi Karikari
(74) *Attorney, Agent, or Firm* — Berkeley Law & Technology Group, LLP

(57) ABSTRACT

Providing assistance data to a mobile device may include receiving from the mobile device one or more messages indicative of its condition. According to an implementation a heatmap is generated based, at least in part, on the condition of the mobile device. The heatmap includes a plurality of expected signature values of wireless signals mapped along a plurality of path segments corresponding to navigable spaces of a floor plan of a venue. The heatmap excludes expected signature values at locations in the venue other than the plurality of path segments. The heatmap is transmitted to the mobile device.

30 Claims, 8 Drawing Sheets

APPARATUS AND METHOD FOR PROVIDING ASSISTANCE DATA HEATMAPS

FIELD

Embodiments described herein are generally directed to the provision of heatmaps to mobile devices for assistance in estimating the position of the mobile devices.

INFORMATION

GPS and other like satellite positioning systems (SPS) have enabled navigation services for mobile handsets in outdoor environments. Since satellite signals may not be reliably received or acquired in some environments, including but not limited to indoor environments, and because positioning accuracy in these environments based on satellite-based positioning techniques may degrade, various non-SPS-based techniques may be employed to enable navigation services for use in these environments. For example, mobile devices may obtain a position fix by measuring ranges to three or more terrestrial wireless access points or femto cells that are positioned at known locations. Such ranges may be measured, for example, by obtaining a MAC ID address from signals received from such access points and obtaining range measurements to the access points by measuring one or more characteristics (signature values) of signals received from such access points such as, for example, signal strength and round trip delay.

A navigation system may provide assistance data or mapped features to a mobile device as it enters a particular area or venue. For example, mapped features may relate to or otherwise identify certain physical objects, characteristics, or points of interest within a building or complex, etc. Thus, in certain instances, an indoor navigation system may provide a digital electronic map to a mobile device upon entering a particular venue, e.g., in response to a request for position assistance data. Such a digital electronic map may show indoor features such as doors, hallways, entry ways, walls, etc., points of interest such as bathrooms, pay phones, room names, stores, etc. A digital electronic map may be stored at a server to be accessible by a mobile device through selection of a URL, for example. By obtaining and displaying a digital electronic map, a mobile device may overlay its current location (and thus the location of its user) over the displayed map to provide the user with additional context, for example.

SUMMARY OF CERTAIN EMBODIMENTS

Broadly speaking, certain embodiments of the claimed subject matter relate to the availability and selection of one of a plurality heatmaps (of the same venue) for transmitting to a mobile device. The heatmaps available for selection may have differing amounts of expected signature values of wireless signals. The selection of which heatmap to transmit may depend, at least in part, upon a condition of the mobile device such as, for example, a remaining battery life, an amount of unused data storage available on the mobile device, and/or a relationship between wireless data "consumed" and a maximum amount of data under a data plan, etc.

In a first embodiment, a method of providing assistance data comprises, at a server, receiving from a mobile device one or more messages indicative of a condition of the mobile device. A heatmap is generated based, at least in part, on the condition of the mobile device. The heatmap includes a plurality of expected signature values of wireless signals mapped along a plurality of path segments corresponding to the navigable spaces of a floor plan of a venue. The heatmap excludes expected signature values at locations in the venue other than the plurality of path segments. The heatmap is transmitted to the mobile device.

In a second embodiment, an apparatus comprises a memory and one or more processors in communication with the memory. The one or more processors are configured to receive from a mobile device one or more messages indicative of a condition of the mobile device. The one or more processors are further configured to generate a heatmap based, at least in part, on the condition of the mobile device. The heatmap includes a plurality of expected signature values of wireless signals mapped along a plurality of path segments corresponding to navigable spaces of a floor plan of a venue. The heatmap excludes expected signature values at locations in the venue other than the first plurality of path segments. The one or more processors are further configured to transmit the selected heatmap to the mobile device.

In a third embodiment, a method of utilizing assistance data comprises, at a mobile device, transmitting to a server one or more messages indicative of a condition of the mobile device. A heatmap (which was generated by the server based, at least in part, on the condition of the mobile device) is received from the server. The heatmap includes a plurality of expected signature values of wireless signals mapped along a plurality of path segments corresponding to navigable spaces of a floor plan of a venue. The heatmap excludes expected signature values at locations in the venue other than the plurality of path segments. One or more received signature values of wireless signals is obtained. A position of the mobile device is determined based upon a comparison of the heatmap and the one or more received signature values of wireless signals.

In a fourth embodiment, a mobile device comprises a memory and one or more processors in communication with the memory. The one or more processors are configured to transmit to a server one or more messages indicative of a condition of the mobile device. The one or more processors are further configured to receive a heatmap from the server, the heatmap being generated by the server based, at least in part, on the condition of the mobile device. The heatmap includes a plurality of expected signature values of wireless signals mapped along a first plurality of path segments corresponding to navigable spaces of a floor plan of a venue. The heatmap excludes expected signature values at locations in the venue other than the plurality of path segments. One or more received signature values of wireless signals is obtained. A position of the mobile device is determined, based upon a comparison of the heatmap and the one or more received signature values of wireless signals.

There are additional aspects to claimed subject matter. It should therefore be understood that the preceding is merely a brief summary of some embodiments and aspects of the claimed subject matter. Additional embodiments and aspects are referenced below. It should further be understood that numerous changes to the disclosed embodiments can be made without departing from the spirit or scope of the claimed subject matter. The preceding summary therefore is not meant to limit the scope of the claimed subject matter. Rather, the scope of the claimed subject matter is to be determined by appended claims and their equivalents.

BRIEF DESCRIPTION OF THE DRAWINGS

These and/or other aspects and advantages of the claimed subject matter will become apparent and more readily appreciated from the following description of certain embodiments, taken in conjunction with the accompanying drawings of which:

DETAILED DESCRIPTION

Figure 1:
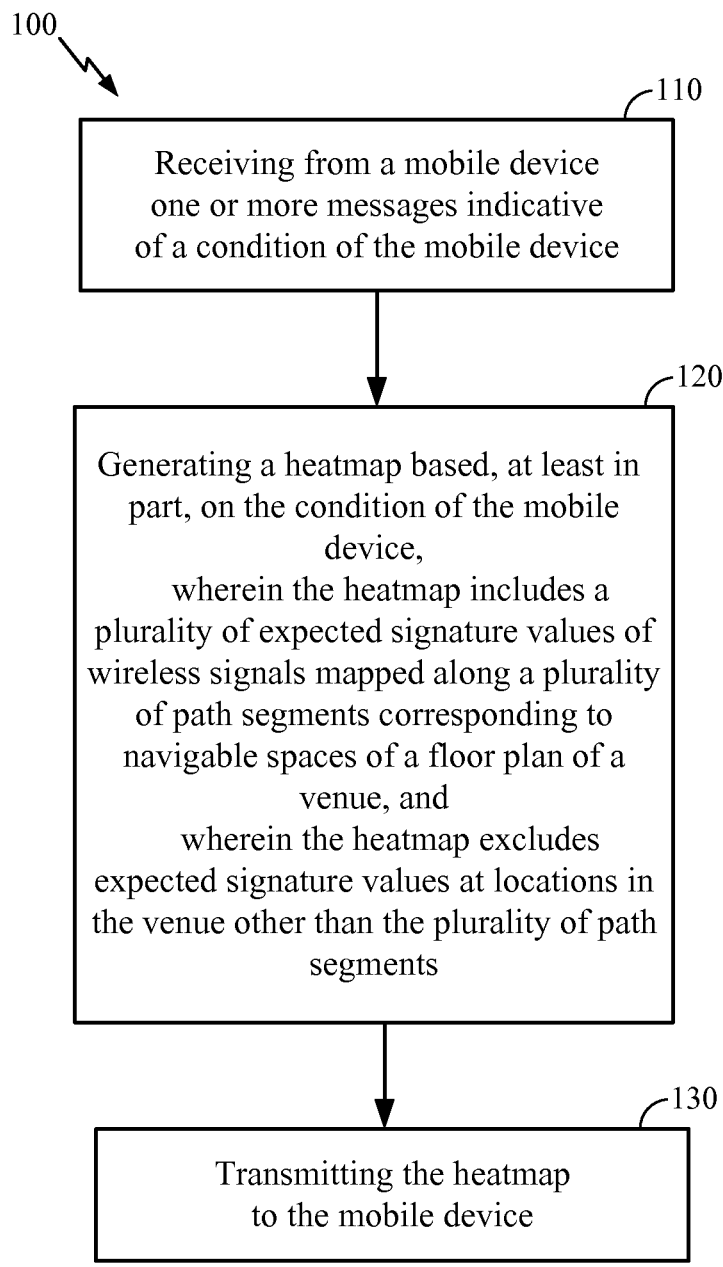
FIG. 1 is a simplified flow diagram of a process for providing assistance data according to an implementation.

The following description is of the best mode presently contemplated for carrying out claimed subject matter. Moreover in the following description, details are set forth by way of example to enable a person of ordinary skill in the art to practice claimed subject matter without undue experimentation. Reference will be made in detail to embodiments of claimed subject matter, examples of which are illustrated in the accompanying drawings, wherein like reference numerals refer to like elements throughout. It is understood that other embodiments may be used and structural and operational changes may be made without departing from the scope of claimed subject matter.

In some implementations of a mobile positioning system, a navigation system may selectively provide positioning assistance data to mobile devices to facilitate and/or enable location determination services for a particular area or venue. Such positioning assistance data may include, for example, information to facilitate measurements of ranges to wireless access points at known, fixed locations. "Venue" may refer to a locale, building, etc., a general area within such a locale, building, etc., or other partially or substantially enclosed area (e.g., urban canyons, etc.), and "location" may refer to a particular or specific position of a mobile device within such a venue (e.g., a grid point, point of interest, etc.). Such details are merely examples, and the scope of claimed subject matter is not limited in this respect.

In some implementations, positioning assistance data may include a "heatmap", i.e., radio heatmap data or "fingerprint" data indicating expected signature values such as, for example, expected characteristics (signature values) of received wireless signals associated with access points or other types of transmitters. A heatmap may indicate one or more expected signature values that correspond to a given position within a venue, which in many instances is an indoor environment. Expected signature values maintained in heatmaps may comprise values associated with wireless signal characteristics (signature values) such as, for example, received signal strength indicator or indication (RSSI) measurements, round trip time (RTT) measurements, round trip delay (RTD) measurements, time of arrival (TOA) measurements, angle of arrival (AOA) measurements, or combinations thereof.

If a mobile device acquires at least one signal having characteristics that match expected signature values that correspond to a given location as indicated by a heatmap, then the mobile device may infer that it is at the given location. In some implementations a heatmap may be laid over or projected onto a schematic map of a venue. In some implementations, heatmap values may comprise location likelihood values that indicate relative likelihoods (e.g., relative probabilities) that a mobile device may be located at one location of a venue such as, for example, an indoor area, as compared to other locations of the venue. A likelihood value may comprise a single number, a numerical range, a probabilistic range (e.g., a mean plus/minus a standard deviation), or any combination thereof.

A heatmap may include a map of a venue, e.g., an outdoor or indoor area, to which it corresponds. Additionally or alternatively, a heatmap may reference positions or locations that are defined or otherwise specified in a map of a venue that is included as part of, e.g., a schematic map. Also, a heatmap may comprise multiple discrete points that are organized in a grid or other arrangement, wherein each point corresponds to a location in a venue. Additionally or alternatively, a heatmap may comprise likelihood values that indicate or are determined based, at least partly, on a continuous positional basis or may comprise contours defined by likelihood values or likelihood value ranges.

In a particular implementation, positioning assistance data may be provided to mobile devices from a local or remote server through wireless communication links Positioning assistance data may be provided as metadata along with metadata included in a digital map. Here, grid points may be laid over locations in a venue at uniform spacing intervals (e.g., two-feet separation of neighboring grid points), wherein each point corresponds to a location in the venue.

However providing mobile devices with heatmaps can sometimes involve the transmission of a very large amount of data. This may be due to the inclusion in such heatmaps of expected signature values associated with a large number of locations within a venue. The transmission of a large amount of data in turn can result in the use by mobile devices of a considerable amount of battery power for receiving and/or processing this data. Additionally some mobile devices may operate under a data plan comprising a predetermined quantity of data to be wirelessly communicated by the mobile device. In other words the data plan allows for a specific quantity of data to be communicated during a given time period for a given payment to a wireless carrier company. For example some wireless carrier companies charge a monthly fee for a given maximum amount of data to be wirelessly communicated by a mobile device. Should that maximum be exceeded, then additional amounts may be charged to the owner or user of the mobile device. Thus a condition of the mobile device may correspond to a relationship between an actual quantity of data wirelessly communicated by the mobile device and the predetermined quantity of data of the data plan. Accordingly the transmission of heatmaps containing large amounts of expected signature values may cause some mobile devices to exceed a maximum data limit of a data plan.

In an implementation therefore two or more heatmaps for the same venue are available for transmitting to a mobile device. The heatmaps available for selection may have differing amounts of expected signature values of wireless signals. The selection of which heatmap to send may depend, at least in part, upon a condition of the mobile device such as, for example, a remaining battery life, an amount of unused data storage available on the mobile device, and/or a relationship between wireless data "consumed" and a maximum amount of data under a data plan, etc. Such conditions are merely examples however, and the scope of the claimed subject matter is not limited in this respect.

FIG. 1 is a simplified flow diagram of a process 100 for providing assistance data according to an implementation. This method may correspond to the processes described in FIGS. 3-9 described in detail elsewhere herein. Claimed subject matter is not limited in scope to the particular order or arrangement of the stages shown. Likewise, additional stages may be included in an embodiment or stages depicting one or more operations in place of those shown may be used in an embodiment. In a particular implementation, one or more messages indicative of a condition of a mobile device may be received from the mobile device. (Block 110) For example the condition may be a remaining battery life of a battery in the mobile device, or an amount of unused data storage available on the mobile device, or any combination thereof. As an alternative example, the condition may correspond to a relationship between an actual quantity of data previously communicated wirelessly by the mobile device and a predetermined quantity of data of a data plan. As a further alternative example, the condition may correspond to a combination of both a remaining battery life of a battery in the mobile device and an amount of unused data storage available on the mobile device.

A heatmap may be generated based, at least in part, on the condition of the mobile device. (Block 120) In an embodiment a selection may be made from two, three or more heatmaps. The heatmaps are all for the same venue, however they may differ from one another by the amount of expected signature values (or data) contained within each heatmap. A heatmap with a relatively greater amount of expected signature values may provide for a more accurate position estimation, but may cause increased mobile device battery power consumption and/or an increased usage of data pursuant to a data plan for example. On the other hand a heatmap of the same venue, but having relatively smaller amount of expected signature values, may provide for a less accurate position estimation, but may decrease power consumption by the mobile device and/or decrease data usage of the mobile device.

A first heatmap may include a first plurality of expected signature values (of wireless signals) mapped onto or along a first plurality of path segments, which in turn corresponds to navigable spaces of a floor plan of the venue. According to an embodiment the first heatmap may have only those expected signature values that are for a set of points corresponding to locations of expected high pedestrian traffic. One example of such expected high traffic may be locations corresponding to path segments that correspond to locations on or near the center of hallways or passageways of an indoor venue such as, for example, a shopping mall or office building, to name a few examples. The first heatmap may exclude expected signature values for locations in the venue other than the first plurality of path segments. Moreover any additional path or path segment information may not need to be provided to the mobile device, as this information may be implicitly transmitted in this heatmap. Any point for which an expected signature value exists may be on a path segment. In some embodiments such a reduced-size heatmap can result in a reduction by a factor of 10 or more of the quantity of data that is to be transmitted, as compared to another heatmap of the same venue but containing data on a grid of points superimposed uniformly throughout all areas of the floor plan of the venue.

According to an embodiment a second heatmap is of the same venue and may include a second plurality of expected signature values (of wireless signals) mapped to the floor plan of the venue. The expected signature values of the second heatmap may comprise a greater number of expected signature values than those of the first heatmap.

In some implementations the second heatmap may include or correspond to a grid of a plurality of points mapped onto the floor plan of the venue at a substantially uniform spacing. Each point corresponds to a location in the venue. The expected signature values may be mapped to the plurality of points.

In other implementations the expected signature values of the second heatmap may be mapped along a second plurality of path segments which comprise more path segments than the path segments of the first heatmap. The second plurality of path segments may include the same path segments as some or all of the first plurality of path segments, but further may include additional path segments. Accordingly the second heatmap may have a greater quantity of expected signature values than the first heatmap. In an implementation, the expected signature values of the second heatmap may be mapped along or onto path segments that correspond to locations on or near the center of rooms or stores in addition to being mapped along or onto path segments corresponding to locations on or near the center of hallways or passageways of the venue. Thus these path segments may define a region that is greater in size than a region defined by the path segments of the first heatmap. Nevertheless this second heatmap still may exclude expected signature values for locations other than the path segments in the second heatmap. Thus while the second heatmap may include a greater quantity of data than the first heatmap (and thus may permit more accurate position estimation capabilities), the second heatmap nevertheless still may have significantly less data as compared to a heatmap containing expected signature values for a grid of points superimposed uniformly throughout all areas of the floor plan of the venue.

The navigable spaces of the floor plan to which the path segments of the first heatmap correspond may define a first region of the venue. The navigable spaces to which the path segments of the second heatmap correspond may define a second region of the venue that is larger than the first region. According to an alternative implementation, the venue is an indoor venue, and the navigable spaces may be comprised of a plurality of corridors or hallways connected to a plurality of rooms. The path segments of the first heatmap may correspond to locations in the plurality of corridors, and none of those path segments may correspond to locations in any of the rooms. On the other hand the second plurality of path segments of the second heatmap may correspond to locations in both the corridors as well as in the rooms.

According to an alternative implementation, a heatmap may include one which has been previously mentioned, i.e., a heatmap containing expected signature values on a grid of points superimposed generally uniformly throughout the floor plan of the venue. Thus each point on the grid may correspond to a location in the venue. This heatmap may contain the most data (as compared to the previously described heatmaps), as it may not confine the expected signature values to path segments. Nevertheless according to an embodiment, this heatmap may be available for selection by the server for sending to mobile devices based, at least in part, upon their condition.

In some implementations the condition of the mobile device (which may form the basis, at least in part, for the determination or selection of a particular heatmap) may be indicative of a remaining battery life of the mobile device, or an amount of unused data storage available on the mobile device, or any combination thereof, and/or may correspond to a relationship between a quantity of data wirelessly communicated by the mobile device and an amount of data defined by a data plan of the mobile device. However regardless of which heatmap is selected or determined, this heatmap may be transmitted to the mobile device for use in estimating its position. (Block 130) Once a heatmap is received by the mobile device, it may use the heatmap to compute the probability of the mobile device being at any given point on a path segment. The computed highest probability point may be used as the estimated location of the mobile device in a venue. In some embodiments additional, optional operations by the mobile device may include the use of a filter (such as, for example, the Viterbi algorithm) which may be used to smooth out the estimated positions on the path segments. In some embodiments, the probability of transition from one point on a path segment to another point may be determined by the proximity of the points on the path segments. In some embodiments the probability of transition may further be determined by other mobile device sensor information such as, for example, inertial sensor information.

According to an implementation, a heatmap includes a plurality of expected signature values of wireless signals mapped along a plurality of path segments. Determining the position of a mobile device may comprise identifying a plurality of points based, at least in part, upon a probability that the mobile device is located at each of the plurality of points, wherein the probability is of a predetermined amount. A portion of the plurality of points that are disposed within or correspond to locations within a bounding box is identified, wherein the bounding box has a predetermined size. The bounding box is one where at least a portion of at least one of the plurality of path segments corresponds to locations within the bounding box.

According to an alternative implementation, a heatmap includes a plurality of expected signature values of wireless signals mapped along a plurality of path segments. Determining the position of a mobile device may comprise identifying a plurality of points based, at least in part, upon a probability that the mobile device is located at each of the plurality of points, wherein the probability is of a predetermined amount. A portion of the plurality of points is identified, wherein the identification is based, at least in part, on a Viterbi process applied to at least a portion of at least one of the plurality of path segments.

Figure 2:
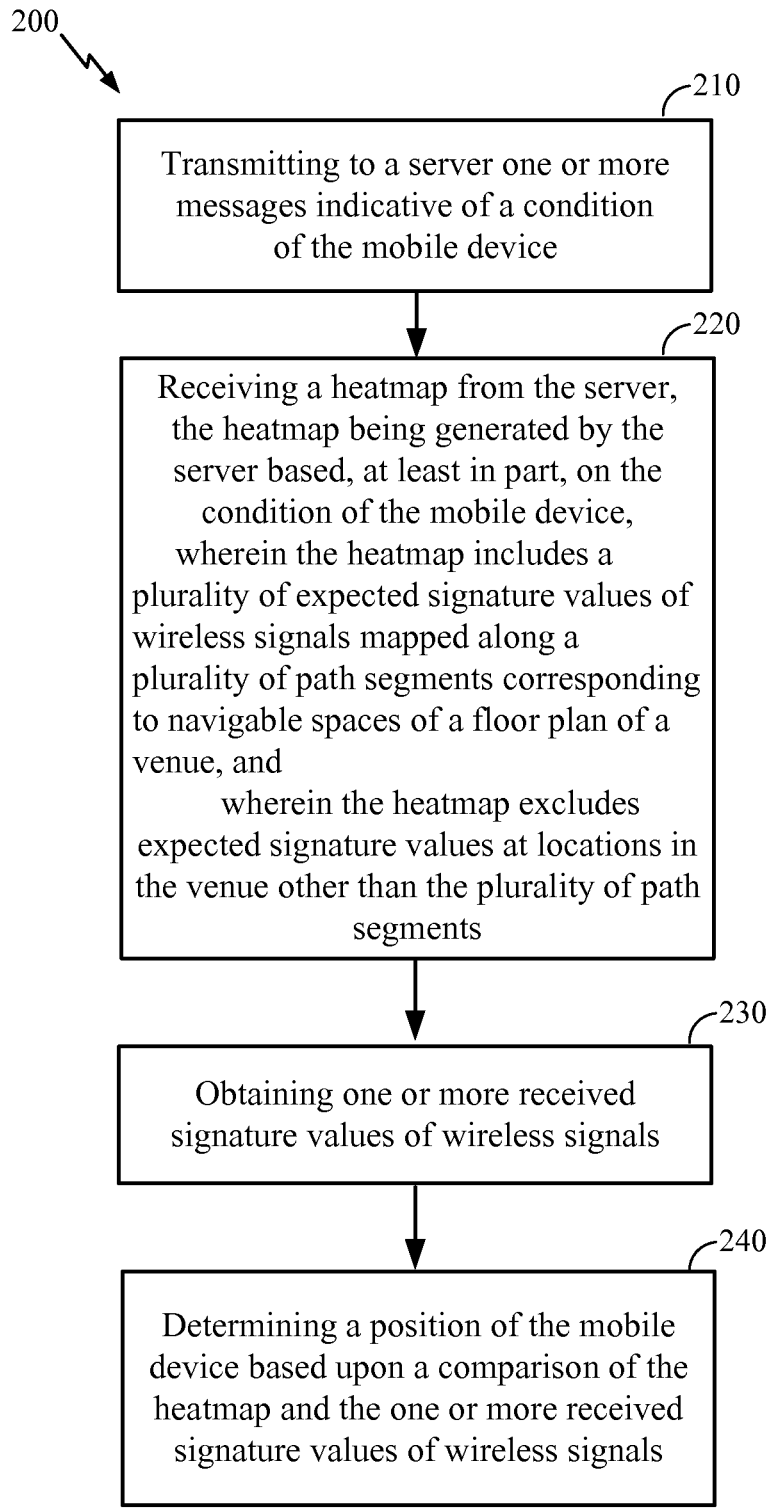
FIG. 2 is a simplified flow diagram of a process for providing assistance data according to an alternative implementation.

FIG. 2 is a simplified flow diagram of a process 200 for providing assistance data, according to an alternative implementation. This method may correspond to the processes described in FIGS. 3-9 described in detail elsewhere herein. Claimed subject matter is not limited in scope to the particular order or arrangement of the stages shown. Likewise, additional stages may be included in an embodiment or stages depicting one or more operations in place of those shown may be used in an embodiment. In a particular implementation, one or more messages indicative of a condition of a mobile device may be transmitted to a server. (Block 210) A heatmap is received from the server, wherein the heatmap is generated by the server based, at least in part, on the condition of the mobile device. (Block 220) One or more received signature values of wireless signals are obtained. (Block 230) A position of the mobile device is determined based upon a comparison of the heatmap and the one or more received signature values of wireless signals. (Block 240)

According to an implementation, the receiving of the heatmap is in response to a selection of one of a first heatmap or a second heatmap based, at least in part, on the condition of the mobile device. Both the first and second heatmaps are for a venue having a plurality of navigable spaces. The first heatmap may include a first plurality of expected signature values mapped onto a first plurality of path segments corresponding to the navigable spaces of a floor plan of the venue. The first heatmap may exclude expected signature values for locations in the venue other than the first plurality of path segments. The second heatmap includes a second plurality of expected signature values mapped to the floor plan of the venue. The second plurality of expected signature values may comprise a greater number of expected signature values than the first plurality of expected signature values.

Figure 3:
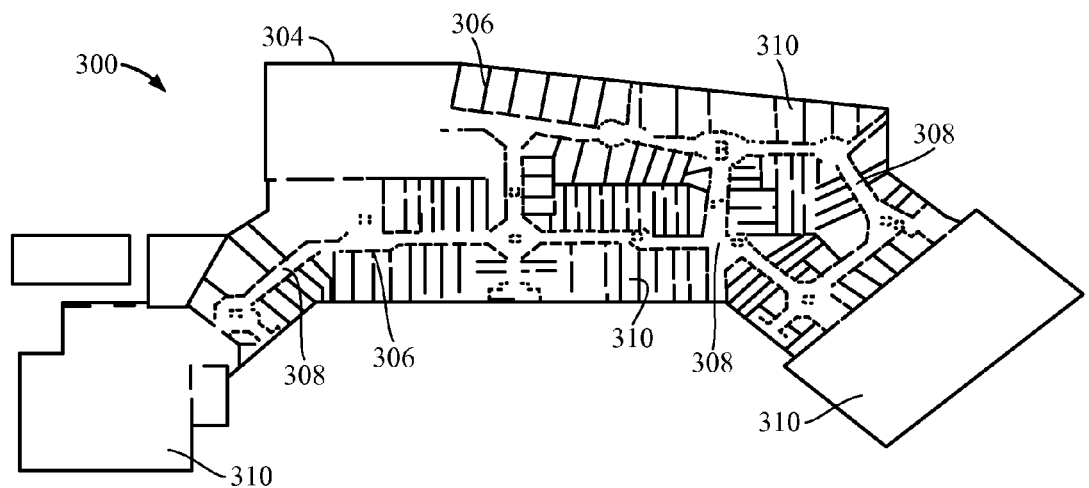
FIG. 3 is a representation of a map 300 of a venue having a plurality of navigable spaces, according to an embodiment.
Figure 4A:
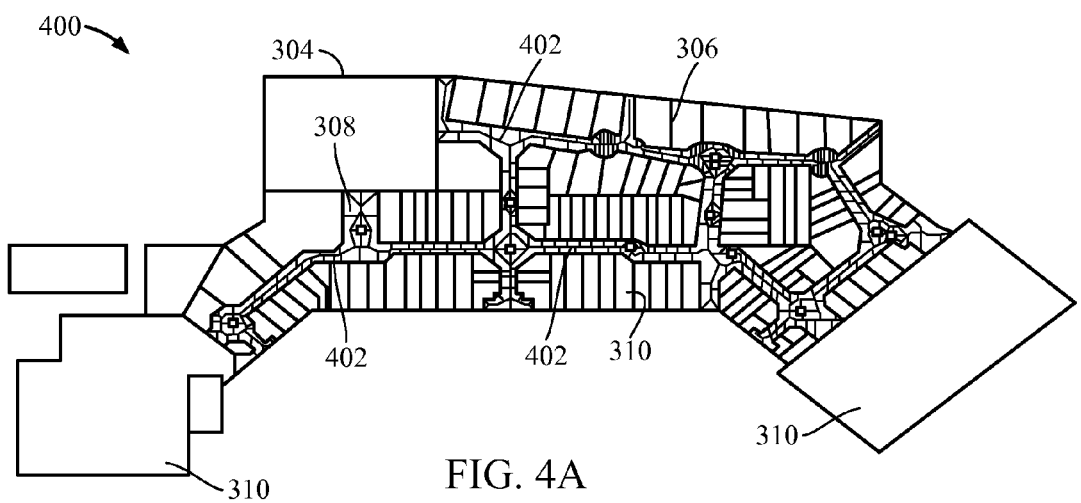
FIG. 4A is a simplified representation of a heatmap according to an embodiment.
Figure 4B:
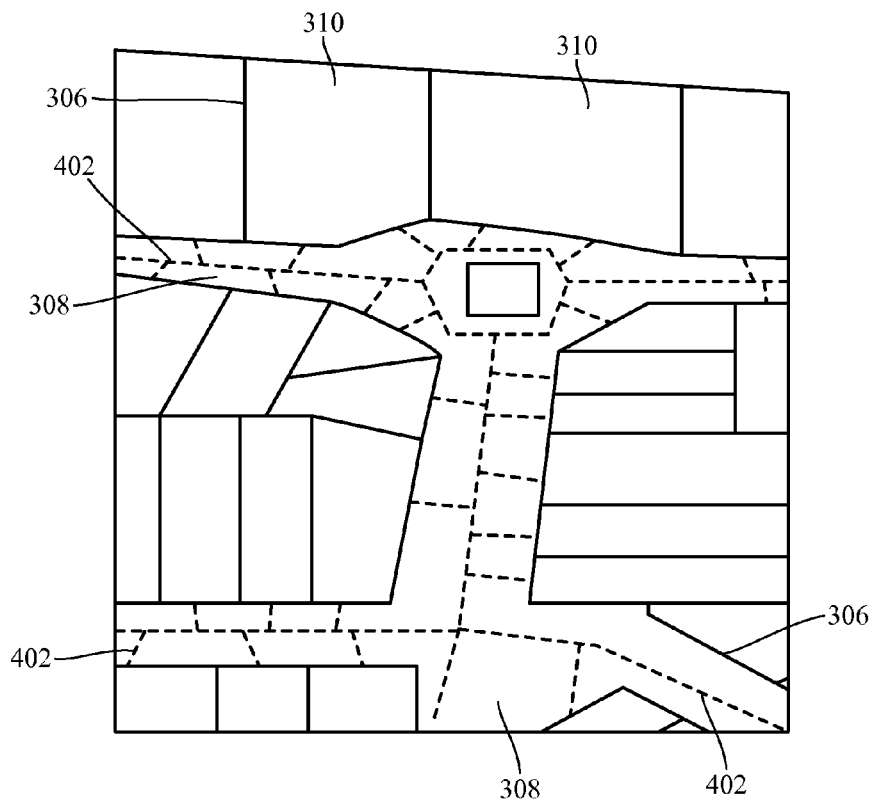
FIG. 4B is a simplified representation of an enlarged portion or section of the heatmap of FIG. 4A.

FIG. 3 illustrates a representation of a map 300 of a venue having a plurality of navigable spaces, according to an embodiment. Map 300 includes a structure 304 having a plurality of features 306 (e.g., walls, doors, etc.). Structure 304 further includes a plurality of hallways 308 leading to a plurality of rooms 310. FIGS. 4A and 4B show a first heatmap 400 that is based at least in part on map 300 of FIG. 3, with FIG. 4B showing an enlarged portion or section of first heatmap 400 of FIG. 4A. Map 300 of FIG. 3 and first heatmap 400 of FIGS. 4A and 4B are of the same venue. As best seen in FIG. 4B, a plurality of path segments 402 (shown as broken lines in FIG. 4B) corresponds to locations that are generally in the center of hallways 308 and leading to entrances of rooms 310. In alternative embodiments however path segments 402 may correspond to locations in hallways 308 only, and not correspond to locations leading to the entrances of rooms 310. Path segments 402 may represent particular locations of navigable spaces in structure 304 where a relatively large number of users likely will be located as they traverse the interior of structure 304. Moreover path segments 402 may have widths that are substantially narrower than hallways 308 to which path segments 402 correspond. According to one implementation, path segments 402 have a width that is less than about 25% of the width of hallways 308 to which path segments 402 correspond. In an alternative implementation, path segments 402 have a width that is less than about 10% of the width of hallways 308 to which path segments 402 correspond. Thus path segments 402 collectively may define an area that is significantly smaller than the area defined by hallways 308 to which path segments 502 correspond.

A first plurality of expected signature values (not shown) may be mapped only along path segments 402. That is, first heatmap 400 may exclude expected signature values at or corresponding to locations other than along path segments 402. In some embodiments the expected signature values may comprise one or more of RSSI's, RTT's, RTD's, TOA's or AOA's, or any combination thereof.

Figure 5A:
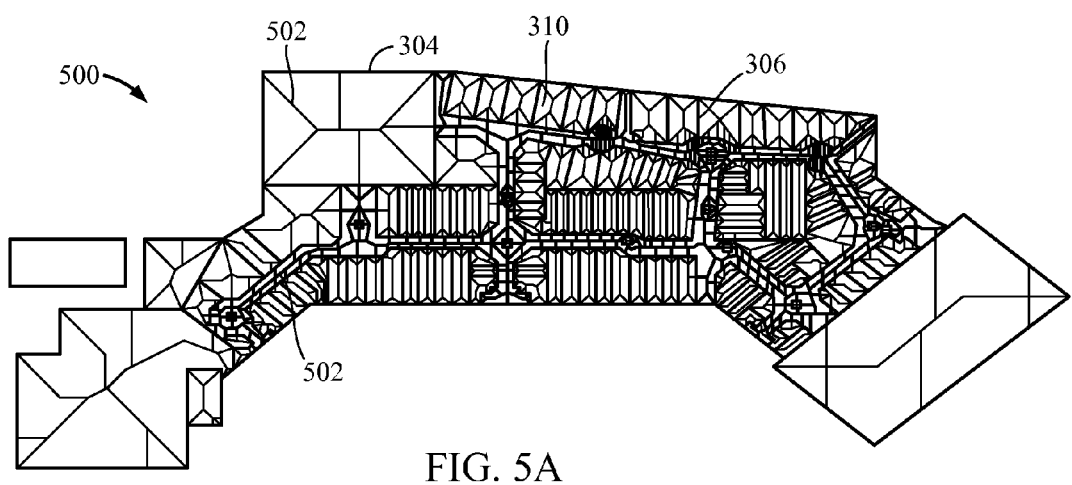
FIG. 5A is a simplified representation of another heatmap according to an alternative embodiment.
Figure 5B:
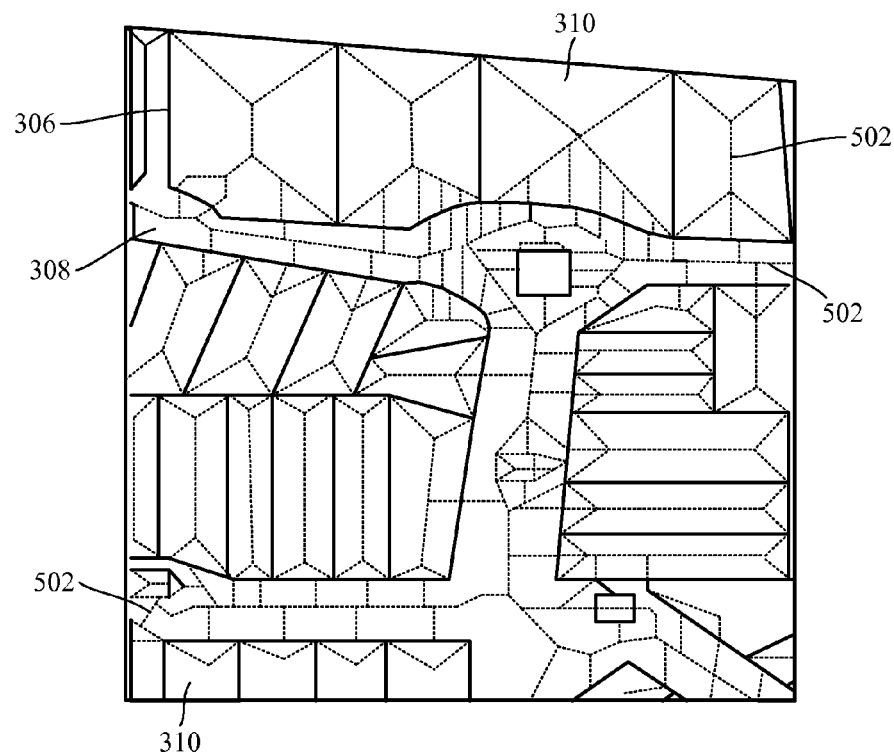
FIG. 5B is a simplified representation of an enlarged portion or section of the heatmap of FIG. 5A.

FIGS. 5A and 5B show a second heatmap 500 that is based at least in part on map 300 of FIG. 3, with FIG. 5B showing an enlarged portion or section of second heatmap 500 of FIG. 5A. Map 300 of FIG. 3, first heatmap 400 of FIGS. 4A and 4B and second heatmap 500 of FIGS. 5A and 5B are of the same venue. As best seen in FIG. 5B a plurality of path segments 502 (shown as broken lines in FIG. 5B) may correspond to locations not only generally in the center of hallways 308, but also may correspond to locations generally in the center of rooms 310 and/or correspond to locations so that the path segments extend from the corners of rooms 310 toward their centers. Moreover for the portion of path segments 502 that corresponds to locations in hallways 308, said path segments 502 may have widths that are substantially narrower than hallways 308. According to one implementation, this portion of path segments 502 have a width that is less than about 25% of the width of hallways 308 to which path segments 502 correspond. In an alternative implementation, this portion of path segments 502 have a width that is less than about 10% of the width of hallways 308 to which this portion of path segments 502 correspond. According to an implementation, the portion of path segments 502 corresponding to locations in rooms 310 are path segments 502 having widths that are approximately the same as the widths of the portion of path segments 502 which correspond to locations in hallways 308. Thus path segments 502 collectively may define an area that is significantly smaller than the area defined by hallways 308 and rooms 310 to which path segments 502 correspond.

A second plurality of expected signature values (not shown) may be mapped along path segments 502. That is, second heatmap 500 may exclude expected signature values at or corresponding to locations other than along path segments 502. In some embodiments the expected signature values of second heatmap 500 may comprise one or more of RSSI's, RTT's, RTD's, TOA's or AOA's, or any combination thereof. Because path segments 502 of second heatmap 500 correspond to locations in rooms 310 of structure 304 (as well as in hallways 308), path segments 502 define a region that is greater in size as compared to a region defined by path segments 402 of first heatmap 400. That is, path segments 502 of second heatmap 500 correspond to locations in a greater portion or larger area of structure 304 as compared with path segments 402 of first heatmap 400. Accordingly the expected signature values in second heatmap 500 may comprise a greater number of values than the expected signature values in first heatmap 400.

Figure 6:
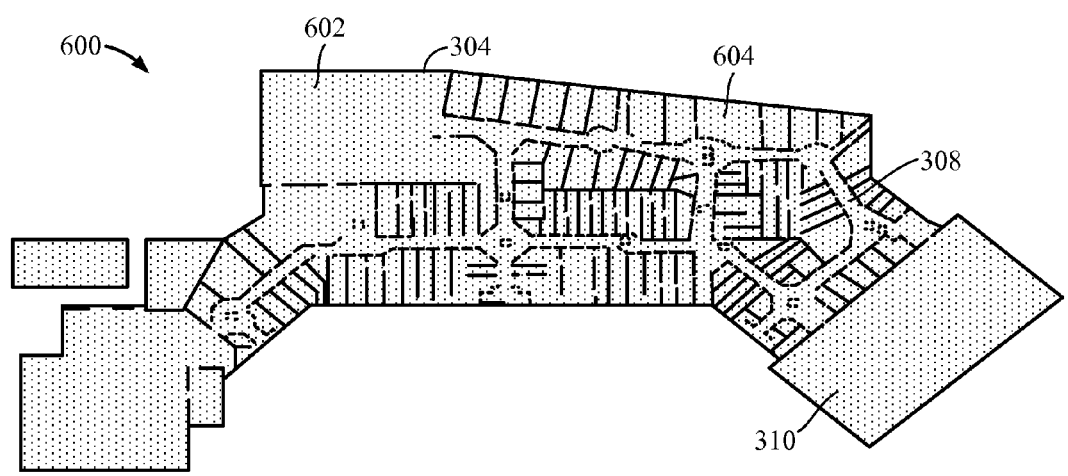
FIG. 6 is a simplified representation of yet another heatmap according to an alternative embodiment.

FIG. 6 shows a third heatmap 600 that is based at least in part on map 300 of FIG. 3. Thus third heatmap 600 is for the same venue as first and second heatmaps 400, 500. A grid of a plurality of points 602 is mapped onto a floor plan 604 of structure 304. Points 602 are disposed at a substantially uniform spacing and further correspond to locations at all areas of structure 304, regardless of whether or not such areas correspond to expected high pedestrian traffic, and/or regardless of whether or not such areas are even navigable. Points 602 correspond to locations on all areas of hallways 308 and rooms 310, and thus are not limited to path segments corresponding to locations in the center of hallways 308 and the center of rooms 310. While points 602 of FIG. 6 are disposed in a generally uniform grid pattern, alternative embodiments may include heatmaps having points disposed in a different or even random pattern without deviating from claimed subject matter. A third plurality of expected signature values (not shown) may be mapped to points 602 and in some embodiments may comprise one or more of RSSI's, RTT's, RTD's, TOA's or AOA's, or any combination thereof. Because points 602 may be disposed in a generally uniform grid pattern projected onto all areas of structure 304, points 602 may cover or define a greater region of structure 304 as compared with path segments 402 of first heatmap 400 or path segments 502 of second heatmap 500. Accordingly the expected signature values in third heatmap 600 may comprise a greater number of values than either the expected signature values in first heatmap 400 or the expected signature values in second heatmap 500.

As discussed elsewhere herein some implementations provide two or more heatmaps for the same venue to be made available for transmitting to a mobile device. The heatmaps available for selection may have differing amounts of expected signature values of wireless signals. The selection of which heatmap to send may depend, at least in part, upon a condition of the mobile device. On the other hand alternative implementations generally provide for providing in a progressive manner additional expected signature values based, at least in part, on the mobile device's condition.

In a particular implementation, a heatmap may be transmitted from a server to a mobile device. The heatmap may include a first plurality of expected signature values mapped along a first plurality of path segments disposed in or corresponding to the navigable spaces, but may exclude expected signature values at locations other than the first plurality of path segments. Messages indicative of a condition of the mobile device later may be received from the mobile device. A second plurality of expected signature values is transmitted to the mobile device based, at least in part, on the mobile device's condition. This second plurality of expected signature values may comprise a greater quantity of expected signature values than the first plurality of expected signature values, or may comprise a smaller quantity of expected signature values. Nevertheless when the second plurality of expected signature values is received by the mobile device and processed so as to supplement the first plurality of expected signature values, the mobile device may have enhanced position estimation capabilities, either as to an improved accuracy of position estimation or as to capabilities for location in more extensive areas or regions within the venue, or both.

In certain implementations the device's condition may correspond to a user command entered into the device corresponding to a desire for additional assistance data. Alternatively the condition may be indicative of a remaining battery life, or alternatively may be indicative of an amount of unused data storage available on the mobile device. Alternatively still the condition may correspond to an amount of wireless data "consumed" by the mobile device in relation to a maximum amount of data under a data plan.

Alternatively still the mobile device's condition may be based, at least in part, on an estimated location of the mobile device in a venue. The estimated location may be based or derived, at least in part, on the first plurality of expected signature values. Upon receipt of the estimated location, the second plurality of expected signature values is selected by a server (or other device) based, at least in part, on the estimated location so that the second plurality of expected signature values corresponds only to locations proximate to the mobile device's estimated position (and not to locations comprising an entire venue). The mobile device then may use the second plurality of expected signature values to update and improve its estimated position.

Alternative embodiments may include a mobile device's condition that is comprised of any combination of the foregoing conditions.

The particular combinations of elements and features in the above-detailed embodiments are exemplary only; the interchanging and substitution of these teachings with other teachings in this document are also expressly contemplated and intended.

According to an implementation, a method of providing assistance data comprises, at a server, transmitting a heatmap to a mobile device, wherein the heatmap corresponds to a floor plan of a venue having navigable spaces. The heatmap includes a first plurality of expected signature values mapped along a first plurality of path segments corresponding to the navigable spaces. The heatmap excludes expected signature values at locations in the venue other than the first plurality of path segments. One or more messages indicative of a condition of the mobile device are received from the mobile device after the transmitting of the heatmap to the mobile device. A second plurality of expected signature values is transmitted to the mobile device based, at least in part, upon the condition of the mobile device. The second plurality of expected signature values is mapped to the floor plan of the venue. The first and second pluralities of expected signature values comprise expected signature values of wireless signals.

According to an aspect of the foregoing method, the condition of the mobile device is based, at least in part, on an estimated location of the mobile device. The estimated location is based, at least in part, on the first plurality of expected signature values. The second plurality of expected signature values is selected based, at least in part, on the estimated location of the mobile device. The second plurality of expected signature values is mapped to the floor plan of the venue at locations proximate to the estimated location of the mobile device. The second plurality of expected signature values excludes expected signature values at locations in the venue other than the locations proximate to the estimated location of the mobile device. The selecting of the second plurality of signature values is prior to the transmitting of the second plurality of expected signature values.

According to an alternative implementation, a method of providing assistance data comprises, at a mobile device, receiving a heatmap from a server, wherein the heatmap corresponds to a floor plan of a venue having navigable spaces. The heatmap includes a first plurality of expected signature values mapped along a first plurality of path segments corresponding to locations in the navigable spaces. The heatmap excludes expected signature values at locations in the venue other than the first plurality of path segments. One or more messages indicative of a condition of the mobile device are transmitted to the server after the receiving of the heatmap. A second plurality of expected signature values is received from the server. The second plurality of expected signature values is based, at least in part, upon the condition of the mobile device. The second plurality of expected signature values is mapped to the floor plan of the venue. The first and second pluralities of expected signature values comprise expected signature values of wireless signals.

According to an aspect of the foregoing method, an estimated location of the mobile device is determined based, at least in part, on the first plurality of expected signature values. The determining of the estimated location is prior to the transmitting the one or more messages indicative of the condition of the mobile device and prior to the receiving of the second plurality of expected signature values. The condition of the mobile device is based, at least in part, on the estimated location of the mobile device. The second plurality of expected signature values is mapped to the floor plan of the venue at locations proximate to the estimated location of the mobile device. The second plurality of expected signature values excludes expected signature values at locations in the venue other than the locations proximate to the estimated location of the mobile device.

Yet further alternative implementations include apparatuses and systems practicing the foregoing methods, e.g., by use of processors and modules for performing the enumerated acts.

Yet further alternative implementations include discs, memories, and other tangible media storing instructions causing one or more computer devices to perform the foregoing methods.

Figure 7:
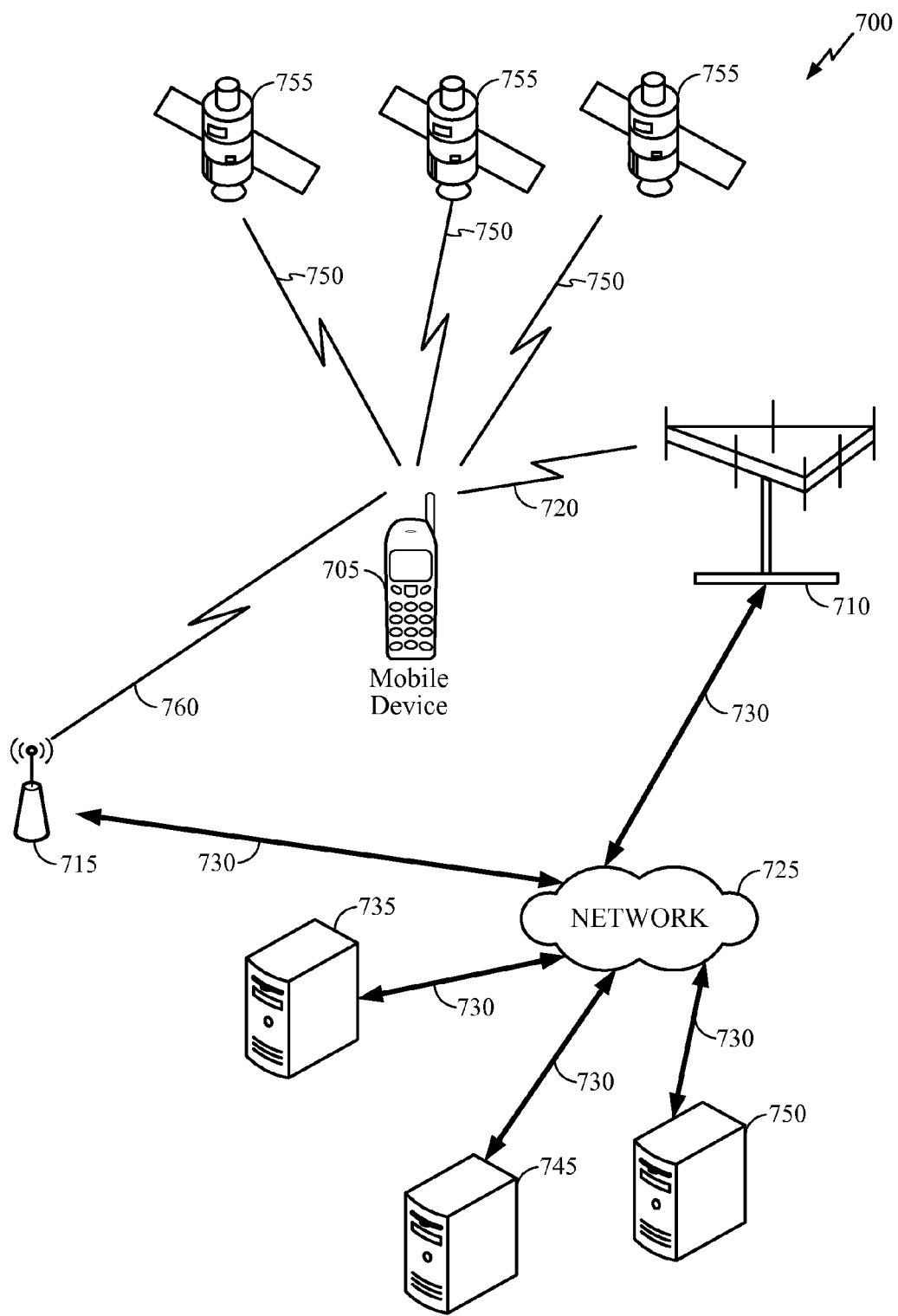
FIG. 7 is a schematic block diagram illustrating a computing and communication environment in which a heatmap may generated, selected and transmitted in accordance with an example implementation.

In certain implementations, as shown in FIG. 7, a communication system 700 includes a mobile device 705 which may receive or acquire satellite positioning system (SPS) signals 750 from SPS satellites 755. In some embodiments, SPS satellites 755 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, mobile device 705 may transmit radio signals to, and receive radio signals from, a wireless communication network. In one example, mobile device 705 may communicate with a cellular communication network by transmitting wireless signals to, or receiving wireless signals from, base station transceiver 710 over wireless communication link 720. Similarly, mobile device 705 may transmit wireless signals to, or receive wireless signals from local transceiver 715 over wireless communication link 760.

In a particular implementation, local transceiver 715 may be configured to communicate with mobile device 705 at a shorter range over wireless communication link 760 than at a range enabled by base station transceiver 710 over wireless communication link 720. For example, local transceiver 715 may be positioned in an indoor environment. Local transceiver 715 may provide access to a wireless local area network (WLAN, e.g., IEEE Std. 802.11 network) or wireless personal area network (WPAN, e.g., Bluetooth network). In another example implementation, local transceiver 715 may comprise a femto cell transceiver capable of facilitating communication on wireless communication link 760 according to a cellular communication protocol. Of course it should be understood that these are merely examples of networks that may communicate with a mobile device over a wireless link, and claimed subject matter is not limited in this respect.

In a particular implementation, base station transceiver 710 and local transceiver 715 may communicate with servers 735, 740 and/or 745 over a network 725 through links 730. Here, network 725 may comprise any combination of wired or wireless links. In a particular implementation, network 725 may comprise Internet Protocol (IP) infrastructure capable of facilitating communication between mobile device 705 and servers 735, 740 or 745 through local transceiver 715 or base station transceiver 710. In another implementation, network 725 may comprise cellular communication network infrastructure such as, for example, a base station controller or master switching center (not shown) to facilitate mobile cellular communication with mobile device 705.

In a particular implementation, mobile device 705 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics (signature values) of signals received from such access points such as, for example, RSSI's, RTT's, RTD's, TOA's or AOA's. In alternative implementations, mobile device 705 may obtain an indoor position fix by applying characteristics (signature values) of acquired signals to a radio heatmap indicating expected RSSI, RTT, RTD, TOA or AOA at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from signals transmitted by the identified transmitters, an expected AOA from signals transmitted by the identified transmitters and possibly standard deviations from these expected AOA, RSSI or RTT, for example. It should be understood, however, that these are merely examples of values that may be stored in a heatmap, and that claimed subject matter is not limited in this respect.

In particular implementations, mobile device 705 may receive positioning assistance parameters for indoor positioning operations from servers 735, 740 or 745. For example, such positioning assistance parameters may include locations and identities of transmitters positioned at known locations to enable measuring ranges to these transmitters based, at least in part, on a measured RSSI and/or RTT, for example. Other positioning assistance parameters to aid indoor positioning operations may include radio heatmaps, magnetic heatmaps, locations and identities of transmitters, routeability graphs, just to name a few examples.

Figure 8:
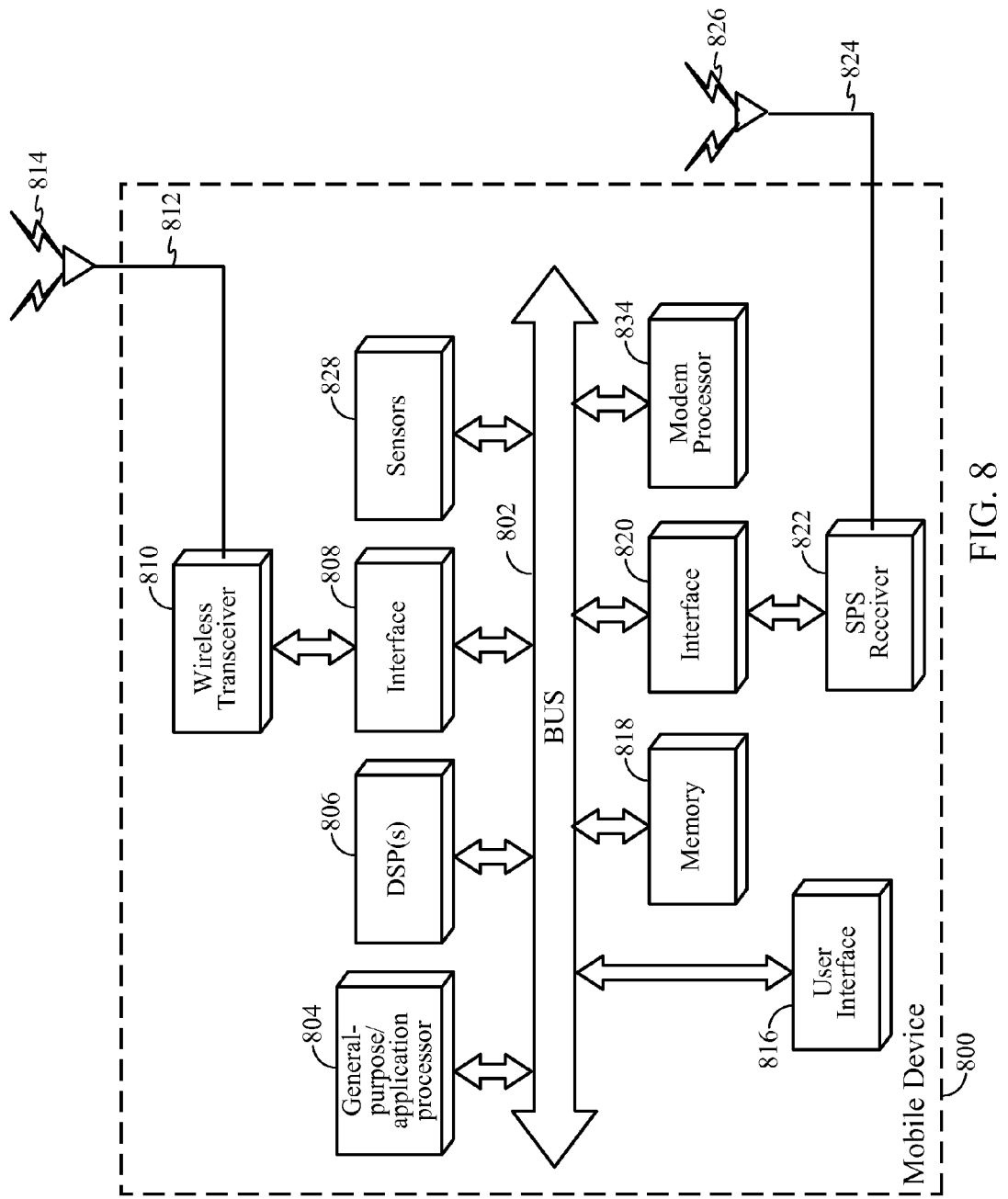
FIG. 8 is a schematic block diagram illustrating certain features of a mobile device that may use, generate, transmit, receive, store or otherwise process a heatmap, in accordance with an example implementation.

FIG. 8 is a schematic diagram of a mobile device 800 according to an embodiment. Mobile device 705 (FIG. 7) may comprise one or more features of mobile device 800 shown in FIG. 8. In certain embodiments, mobile device 800 may also comprise a wireless transceiver 810 which is capable of transmitting and receiving wireless signals 814 via wireless antenna 812 over a wireless communication network. Wireless transceiver 810 may be connected to bus 802 by a wireless transceiver bus interface 808. Wireless transceiver bus interface 808 may, in some embodiments be at least partially integrated with wireless transceiver 810. Some embodiments may include multiple wireless transceivers 810 and wireless antennas 812 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 800 may also comprise SPS receiver 822 capable of receiving and acquiring SPS signals 826 via SPS antenna 824. SPS receiver 822 may be connected to bus 802 by a SPS bus interface 820. SPS receiver 822 may also process, in whole or in part, acquired SPS signals 826 for estimating a location of mobile device 800. In some embodiments, general-purpose processor(s) 804, memory 818, DSP (s) 806 and/or specialized processors (not shown) may also be utilized to process acquired SPS signals, in whole or in part, and/or calculate an estimated location of mobile device 800, in conjunction with SPS receiver 822. Storage of SPS or other signals for use in performing positioning operations may be performed in memory 818 or registers (not shown).

DSP(s) 806 may be connected to bus 802 by a bus interface (not shown), and general-purpose processor(s) 804 may be connected to bus 802 by a bus interface (not shown) and memory 818. Bus interface (not shown) may be integrated with the DSP(s) 806, general-purpose processor(s) 804 and memory 818. In various embodiments, functions may be performed in response execution of one or more machine-readable instructions stored in memory 818 such as on a computer-readable storage medium, such as RAM, ROM, FLASH, or disc drive, just to name a few examples. The one or more instructions may be executable by general-purpose processor(s) 804, specialized processors, or DSP(s) 806. Memory 818 may comprise a non-transitory processor-readable memory and/or a computer-readable memory that stores software code (programming code, instructions, etc.) that are executable by processor(s) 804 and/or DSP(s) 806 to perform functions described herein. In a particular implementation, wireless transceiver 810 may communicate with general-purpose processor(s) 804 and/or DSP(s) 806 through bus 802 to enable mobile device 800 to be configured as a wireless station (STA) as discussed above. General-purpose processor(s) 804 and/or DSP(s) 806 may execute instructions to execute one or more aspects of processes discussed above in connection with, for example, the transmitting of messages indicative of a condition of mobile device 800, and the receiving and processing of a heatmap that was transmitted to mobile device 800 in response to the messages.

In one particular implementation, transmission of an acknowledgment (ACK) message in response to a fine time measurement (FTM) request message may be performed by wireless transceiver device 810 without instruction or initiation from general-purpose processor(s) 804 or DSP(s) 806. On the other hand, a FTM range report message may be formed at a programmable device such as general-purpose processor(s) 804 and/or DSP(s) 806 (e.g., from execution of one or more machine-readable instructions stored in memory 818).

Also shown in FIG. 8, a user interface 816 may comprise any one of several devices such as, for example, a speaker, microphone, display device, vibration device, keyboard, touch screen, just to name a few examples. In a particular implementation, user interface 816 may enable a user to interact with one or more applications hosted on mobile device 800. For example, devices of user interface 816 may store analog or digital signals on memory 818 to be further processed by DSP(s) 806 or general purpose/application processor 804 in response to an action from a user. Similarly, applications hosted on mobile device 800 may store analog or digital signals on memory 818 to present an output signal to a user.

Mobile device 800 may also comprise sensors 828 coupled to bus 802 which may include, for example, inertial sensors and environment sensors. Inertial sensors of sensors 828 may comprise, for example accelerometers (e.g., collectively responding to acceleration of mobile device 800 in three dimensions), one or more gyroscopes or one or more magnetometers (e.g., to support one or more compass applications). Environment sensors of mobile device 800 may comprise, for example, temperature sensors, barometric pressure sensors, ambient light sensors, camera imagers, microphones, just to name few examples. Sensors 828 may generate analog or digital signals that may be stored in memory 818 and processed by DPS(s) or general purpose/ application processor 804 in support of one or more applications such as, for example, applications directed to positioning or navigation operations.

In a particular implementation, mobile device 800 may comprise a dedicated modem processor 834 capable of performing baseband processing of signals received and downconverted at wireless transceiver 810 or SPS receiver 822. Similarly, dedicated modem processor 834 may perform baseband processing of signals to be upconverted for transmission by wireless transceiver 810. In alternative implementations, instead of having a dedicated modem processor, baseband processing may be performed by a general purpose processor or DSP (e.g., general purpose/application processor 804 or DSP(s) 806). It should be understood, however, that these are merely examples of structures that may perform baseband processing, and that claimed subject matter is not limited in this respect.

Figure 9:
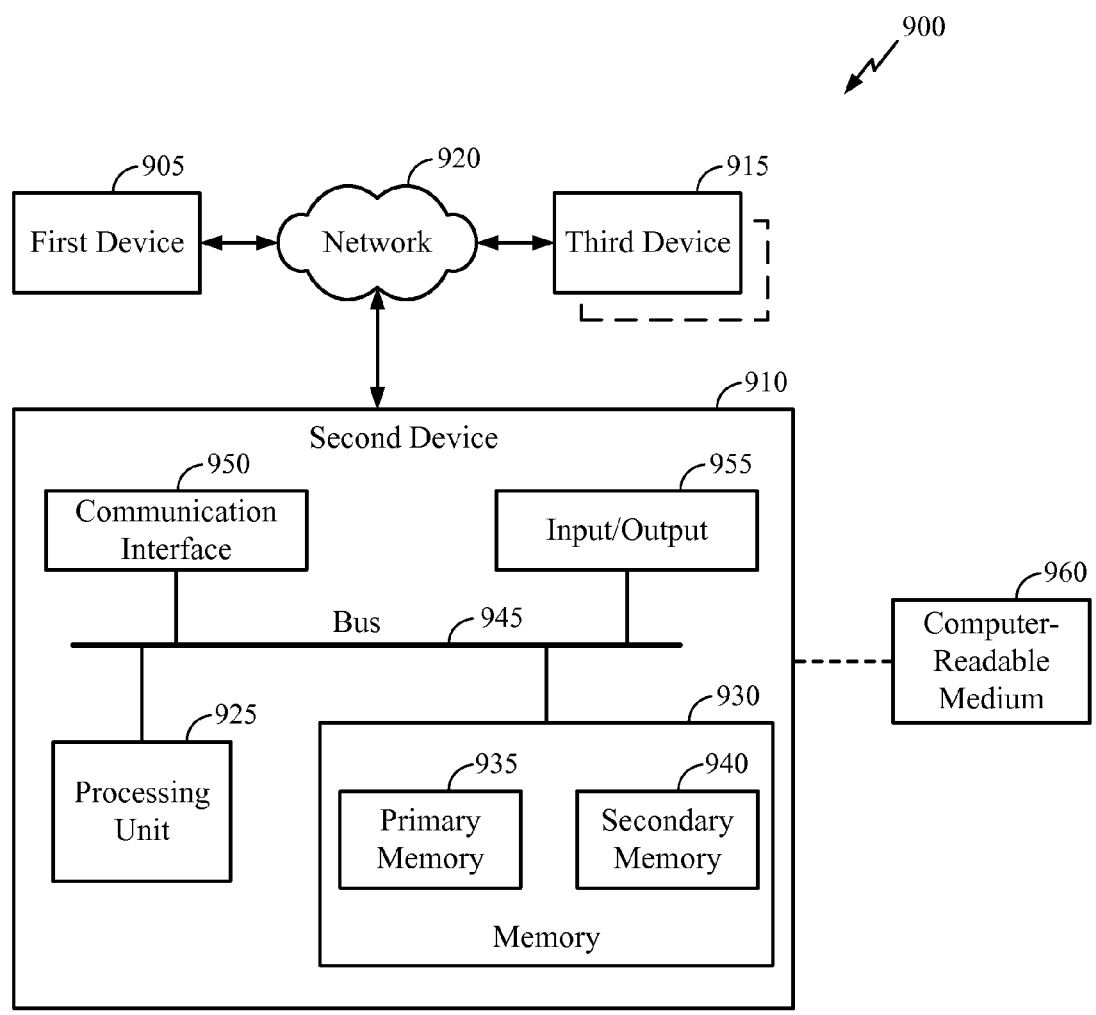
FIG. 9 is a schematic diagram illustrating an example system that may include one or more devices configurable to implement techniques or processes described elsewhere herein.

FIG. 9 is a schematic diagram illustrating an example system 900 that may include one or more devices configurable to implement techniques or processes described above. System 900 may include, for example, a first device 905, a second device 910, and a third device 915, which may be operatively coupled together through a wireless communications network 920. In an aspect, first device 905 may comprise a server to receive one or more messages indicative of a condition of a mobile device, to select a heatmap from a plurality of heatmaps based, at least in part, on the condition of the mobile device, and to transmit the selected heatmap to the mobile device, just to provide a few examples. Also, in an aspect, wireless communications network 920 may comprise one or more wireless access points, for example. However, claimed subject matter is not limited in scope in these respects.

First device 905, second device 910 and third device 915 may be representative of any device, appliance or machine to receive one or more messages indicative of a condition of a mobile device, to select a heatmap from a plurality of heatmaps based, at least in part, on the condition of the mobile device, and to transmit the selected heatmap to the mobile device, just to provide a few examples. By way of example but not limitation, any of first device 905, second device 910, or third device 915 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 905, 910, and 915, respectively, may comprise one or more of a base station almanac server, a base station, or a mobile device in accordance with the examples described herein.

Similarly, wireless communications network 920, may be representative of one or more communication links, processes, or resources configurable to support the exchange of data between at least two of first device 905, second device 910, and third device 915. By way of example but not limitation, wireless communications network 920 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 915, there may be additional like devices operatively coupled to wireless communications network 920.

It is recognized that all or part of the various devices and networks shown in system 900, and the processes and methods as further described herein, may be implemented using or otherwise including hardware, firmware, software, or any combination thereof.

Thus, by way of example but not limitation, second device 910 may include at least one processing unit 925 that is operatively coupled to a memory 930 through a bus 945.

Processing unit 925 is representative of one or more circuits configurable to perform at least a portion of a data computing procedure or process. By way of example but not limitation, processing unit 925 may include one or more processors, controllers, microprocessors, microcontrollers, application specific integrated circuits, digital signal processors, programmable logic devices, field programmable gate arrays, and the like, or any combination thereof.

Memory 930 is representative of any data storage mechanism. Memory 930 may include, for example, a primary memory 935 or a secondary memory 940. Primary memory 935 may include, for example, a random access memory, read only memory, etc. While illustrated in this example as being separate from processing unit 925, it should be understood that all or part of primary memory 935 may be provided within or otherwise co-located/coupled with processing unit 925.

In a particular implementation, a digital map of an indoor area may be stored in a particular format in memory 930. Processing unit 925 may execute instructions to receive one or more messages indicative of a condition of a mobile device, to select a heatmap from a plurality of heatmaps based, at least in part, on the condition of the mobile device, and to transmit the selected heatmap to the mobile device, just to provide a few examples.

Secondary memory 940 may include, for example, the same or similar type of memory as primary memory or one or more data storage devices or systems, such as, for example, a disk drive, an optical disc drive, a tape drive, a solid state memory drive, etc. In certain implementations, secondary memory 940 may be operatively receptive of, or otherwise configurable to couple to, a computer-readable medium 960. Computer-readable medium 960 may include, for example, any non-transitory medium that can carry or make accessible data, code or instructions for one or more of the devices in system 900. Computer-readable medium 960 may also be referred to as a storage medium.

Second device 910 may include, for example, a communication interface 950 that provides for or otherwise supports the operative coupling of second device 910 to at least wireless communications network 920. By way of example but not limitation, communication interface 950 may include a network interface device or card, a modem, a router, a switch, a transceiver, and the like.

Second device 910 may include, for example, an input/output device 955. Input/output device 955 is representative of one or more devices or features that may be configurable to accept or otherwise introduce human or machine inputs, or one or more devices or features that may be configurable to deliver or otherwise provide for human or machine outputs. By way of example but not limitation, input/output device 955 may include an operatively configured display, speaker, keyboard, mouse, trackball, touch screen, data port, etc.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "estimating", "establishing", "obtaining", "identifying", "receiving", "transmitting", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

In view of the above, it will be appreciated that certain embodiments overcome many of the long-standing problems in the art by providing a method and/or apparatus for providing assistance data. In an implementation two or more heatmaps for the same venue are available for transmitting to a mobile device. The heatmaps available for selection may have differing amounts of expected signature values of wireless signals. The selection of which heatmap to send may depend, at least in part, upon a condition of the mobile device such as, for example, a remaining battery life or an amount of unused data storage available on the mobile device, or any combination thereof, and/or a relationship between wireless data "consumed" and a maximum amount of data under a data plan, etc. Such conditions are merely examples however, and the scope of the claimed subject matter is not limited in this respect.

What is claimed is:

1. A method of providing assistance data comprising, at a server:
    receiving from a mobile device one or more messages indicative of a condition of the mobile device;
    generating a heatmap based, at least in part, on the condition of the mobile device,
        wherein the heatmap includes a plurality of expected signature values of wireless signals mapped only along a plurality of path segments corresponding to navigable spaces of a floor plan of a venue, and
        wherein the heatmap excludes expected signature values at locations in the venue other than the plurality of path segments; and
    transmitting the heatmap to the mobile device.

2. The method of claim 1, wherein the plurality of expected signature values of wireless signals mapped only along the plurality of path segments is a selected plurality of expected signature values of wireless signals mapped only along a selected plurality of path segments, and wherein the generating the heatmap comprises:
    selecting one of a first heatmap or a second heatmap based, at least in part, on the condition of the mobile device,
        wherein the first and second heatmaps are for the venue,
        wherein the first heatmap includes a first plurality of expected signature values of wireless signals mapped only along a first plurality of path segments corresponding to the navigable spaces of the floor plan of the venue, and wherein the first heatmap excludes expected signature values at locations in the venue other than the first plurality of path segments,
        wherein the second heatmap includes a second plurality of expected signature values of wireless signals mapped only along a second plurality of path segments corresponding to the navigable spaces of the floor plan of the venue, and wherein the second heatmap excludes expected signature values at locations in the venue other than the second plurality of path segments, and
        wherein the second plurality of expected signature values comprises a greater number of expected signature values than the first plurality of expected signature values.

3. The method of claim 2, wherein the navigable spaces of the floor plan, to which the first plurality of path segments corresponds, define a first region of the venue,
    wherein the navigable spaces of the floor plan, to which the second plurality of path segments corresponds, define a second region of the venue, and
    wherein the first region is smaller than the second region.

4. The method of claim 3 wherein the venue is an indoor venue, wherein the navigable spaces are comprised of a plurality of corridors connected to a plurality of rooms,
    wherein the first plurality of path segments of the first heatmap corresponds to the plurality of corridors, and wherein none of the first plurality of path segments corresponds to any room of the plurality of rooms, and
    wherein the second plurality of path segments of the second heatmap corresponds to both the plurality of corridors and the plurality of rooms.

5. The method of claim 1 wherein the condition of the mobile device is indicative of a remaining battery life, or an amount of unused data storage available on the mobile device, or any combination thereof.

6. The method of claim 1 wherein the mobile device is further to communicate according to a data plan comprising a predetermined quantity of data to be wirelessly communicated by the mobile device, and
    wherein the condition of the mobile device corresponds to a relationship between an actual quantity of data wirelessly communicated by the mobile device and the predetermined quantity of data of the data plan.

7. The method of claim 2 wherein the expected signature values of the first and second pluralities of expected signature values comprise one or more of received signal strength indicator (RSSI) measurements, round trip time (RTT) measurements, round trip delay (RTD) measurements, time of arrival (TOA) measurements, angle of arrival (AOA) measurements, or any combination thereof.

8. An apparatus comprising:
    a memory; and
    one or more processors in communication with the memory, wherein the one or more processors are configured to:
        receive from a mobile device one or more messages indicative of a condition of the mobile device;
        generate a heatmap based, at least in part, on the condition of the mobile device,
            wherein the heatmap includes a plurality of expected signature values of wireless signals mapped only along a plurality of path segments corresponding to navigable spaces of a floor plan of a venue, and
            wherein the heatmap excludes expected signature values at locations in the venue other than the plurality of path segments; and
        transmit the heatmap to the mobile device.

9. The apparatus of claim 8 wherein the plurality of expected signature values of wireless signals mapped only along the plurality of path segments is a selected plurality of expected signature values of wireless signals mapped only along a selected plurality of path segments, and wherein the one or more processors are further configured to generate the heatmap by selecting one of a first heatmap or a second heatmap based, at least in part, on the condition of the mobile device, wherein the first and second heatmaps are for the venue, wherein the first heatmap includes a first plurality of expected signature values of wireless signals mapped only along a first plurality of path segments corresponding to the navigable spaces of the floor plan of the venue, and wherein the first heatmap excludes expected signature values at locations in the venue other than the first plurality of path segments, wherein the second heatmap includes a second plurality of expected signature values of wireless signals mapped only along a second plurality of path segments corresponding to the navigable spaces of the floor plan of the venue, and wherein the second heatmap excludes expected signature values at locations in the venue other than the second plurality of path segments, and wherein the second plurality of expected signature values comprises a greater number of expected signature values than the first plurality of expected signature values.

10. The apparatus of claim 9, wherein the navigable spaces of the floor plan to which the first plurality of path segments corresponds defines a first region of the venue, wherein the navigable spaces of the floor plan to which the second plurality of path segments corresponds defines a second region of the venue, and wherein the first region is smaller than the second region.

11. The apparatus of claim 10 wherein the venue is an indoor venue, wherein the navigable spaces are comprised of a plurality of corridors connected to a plurality of rooms, wherein the first plurality of path segments of the first heatmap corresponds to the plurality of corridors, and wherein none of the first plurality of path segments corresponds to any room of the plurality of rooms, and wherein the second plurality of path segments of the second heatmap corresponds to both the plurality of corridors and the plurality of rooms.

12. The apparatus of claim 8 wherein the condition of the mobile device is indicative of a remaining battery life, or an amount of unused data storage available on the mobile device, or any combination thereof.

13. The apparatus of claim 8 wherein the mobile device is further to communicate according to a data plan comprising a predetermined quantity of data to be wirelessly communicated by the mobile device, and wherein the condition of the mobile device corresponds to a relationship between an actual quantity of data wirelessly communicated by the mobile device and the predetermined quantity of data of the data plan.

14. The apparatus of claim 8 wherein the plurality of expected signature values comprises one or more of received signal strength indicator (RSSI) measurements, round trip time (RTT) measurements, round trip delay (RTD) measurements, time of arrival (TOA) measurements, angle of arrival (AOA) measurements, or any combination thereof.

15. A method of utilizing assistance data comprising, at a mobile device:

transmitting to a server one or more messages indicative of a condition of the mobile device;

receiving a heatmap from the server, the heatmap being generated by the server based, at least in part, on the condition of the mobile device, wherein the heatmap includes a plurality of expected signature values of wireless signals mapped only along a plurality of path segments corresponding to navigable spaces of a floor plan of a venue, and wherein the heatmap excludes expected signature values at locations in the venue other than the plurality of path segments;

obtaining one or more received signature values of wireless signals; and determining a position of the mobile device based upon a comparison of the heatmap and the one or more received signature values of wireless signals.

16. The method of claim 15, wherein the plurality of expected signature values of wireless signals mapped only along the plurality of path segments is a selected plurality of expected signature values of wireless signals mapped only along a selected plurality of path segments, wherein the receiving of the heatmap is in response to a selection of one of a first heatmap or a second heatmap based, at least in part, on the condition of the mobile device, wherein the first and second heatmaps are for the venue, wherein the first heatmap includes a first plurality of expected signature values of wireless signals mapped only along a first plurality of path segments corresponding to the navigable spaces of the floor plan of the venue, and wherein the first heatmap excludes expected signature values at locations in the venue other than the first plurality of path segments, wherein the second heatmap includes a second plurality of expected signature values of wireless signals mapped only along a second plurality of path segments corresponding to the navigable spaces of the floor plan of the venue, and wherein the second heatmap excludes expected signature values at locations in the venue other than the second plurality of path segments, and wherein the second plurality of expected signature values comprises a greater number of expected signature values than the first plurality of expected signature values.

17. The method of claim 16 wherein the navigable spaces of the floor plan, to which the first plurality of path segments corresponds, define a first region of the venue, wherein the navigable spaces of the floor plan, to which the second plurality of path segments corresponds, define a second region of the venue, and wherein the first region is smaller than the second region.

18. The method of claim 17 wherein the venue is an indoor venue, wherein the navigable spaces are comprised of a plurality of corridors connected to a plurality of rooms, wherein the first plurality of path segments of the first heatmap corresponds to the plurality of corridors, and wherein none of the first plurality of path segments corresponds to any one room of the plurality of rooms, and wherein the second plurality of path segments of the second heatmap corresponds to both the plurality of corridors and the plurality of rooms.

19. The method of claim 16 wherein the condition of the mobile device is indicative of a remaining battery life, or an amount of unused data storage available on the mobile device, or any combination thereof.

20. The method of claim 16 wherein the mobile device is further to communicate according to a data plan comprising a predetermined quantity of data to be wirelessly communicated by the mobile device, and
wherein the condition of the mobile device corresponds to a relationship between an actual quantity of data wirelessly communicated by the mobile device and the predetermined quantity of data of the data plan.

21. The method of claim 16 wherein the expected signature values of the first and second pluralities of expected signature values comprise one or more of received signal strength indicator (RSSI) measurements, round trip time (RTT) measurements, round trip delay (RTD) measurements, time of arrival (TOA) measurements, angle of arrival (AOA) measurements, or any combination thereof.

22. The method of claim 15 wherein the determining of the position of the mobile device further comprises:
identifying a plurality of points based, at least in part, upon a probability of a predetermined amount that the mobile device is located at each of the plurality of points; and
identifying a portion of the plurality of points corresponding to an interior of a bounding box having a predetermined size, wherein at least a portion of at least one of the plurality of path segments corresponds to the interior of the bounding box.

23. The method of claim 15 wherein the determining of the position of the mobile device further comprises:
identifying a plurality of points based, at least in part, upon a probability of a predetermined amount that the mobile device is located at each of the plurality of points; and
identifying a portion of the plurality of points based, at least in part, on a Viterbi process applied to at least a portion of at least one of the plurality of path segments.

24. A mobile device comprising:
a memory; and
one or more processors in communication with the memory, wherein the one or more processors are configured to:
transmit to a server one or more messages indicative of a condition of the mobile device;
receive a heatmap from the server, the heatmap being generated by the server based, at least in part, on the condition of the mobile device,
wherein the heatmap includes a plurality of expected signature values of wireless signals mapped only along a plurality of path segments corresponding to navigable spaces of a floor plan of a venue, and
wherein the heatmap excludes expected signature values at locations in the venue other than the plurality of path segments;
obtain one or more received signature values of wireless signals; and
determine a position of the mobile device based upon a comparison of the heatmap and the one or more received signature values of wireless signals.

25. The mobile device of claim 24 wherein the plurality of expected signature values of wireless signals mapped only along the plurality of path segments is a selected plurality of expected signature values of wireless signals mapped only along a selected plurality of path segments,
wherein the one or more processors are further configured to receive the heatmap in response to a selection of one of a first heatmap or a second heatmap based, at least in part, on the condition of the mobile device,
wherein the first and second heatmaps are for the venue,
wherein the first heatmap includes a first plurality of expected signature values of wireless signals mapped only along a first plurality of path segments corresponding to the navigable spaces of the floor plan of the venue, and wherein the first heatmap excludes expected signature values at locations in the venue other than the first plurality of path segments,
wherein the second heatmap includes a second plurality of expected signature values of wireless signals mapped only along a second plurality of path segments corresponding to the navigable spaces of the floor plan of the venue, and wherein the second heatmap excludes expected signature values at locations in the venue other than the second plurality of path segments, and
wherein the second plurality of expected signature values comprises a greater number of expected signature values than the first plurality of expected signature values.

26. The mobile device of claim 25 wherein the navigable spaces of the floor plan, to which the first plurality of path segments corresponds, define a first region of the venue,
wherein the navigable spaces of the floor plan, to which the second plurality of path segments corresponds, define a second region of the venue, and
wherein the first region is smaller than the second region.

27. The mobile device of claim 26 wherein the venue is an indoor venue, wherein the navigable spaces are comprised of a plurality of corridors connected to a plurality of rooms,
wherein the first plurality of path segments of the first heatmap corresponds to the plurality of corridors, and wherein none of the first plurality of path segments corresponds to any one room of the plurality of rooms, and
wherein the second plurality of path segments of the second heatmap corresponds to both the plurality of corridors and the plurality of rooms.

28. The mobile device of claim 24 wherein the condition of the mobile device is indicative of a remaining battery life, or an amount of unused data storage available on the mobile device, or any combination thereof.

29. The mobile device of claim 24 wherein the mobile device is further to communicate according to a data plan comprising a predetermined quantity of data to be wirelessly communicated by the mobile device, and
wherein the condition of the mobile device corresponds to a relationship between an actual quantity of data wirelessly communicated by the mobile device and the predetermined quantity of data of the data plan.

30. The mobile device of claim 24 wherein the plurality of expected signature values comprises one or more of received signal strength indicator (RSSI) measurements, round trip time (RTT) measurements, round trip delay (RTD) measurements, time of arrival (TOA) measurements, angle of arrival (AOA) measurements, or any combination thereof.

* * * * *